(12) United States Patent
Cook et al.

(10) Patent No.: US 8,040,700 B2
(45) Date of Patent: Oct. 18, 2011

(54) CHARGE PUMP FOR USE WITH A SYNCHRONOUS LOAD

(75) Inventors: Thomas D. Cook, Austin, TX (US); Jeffrey C. Cunningham, Austin, TX (US); Karthik Ramanan, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 149 days.

(21) Appl. No.: 12/619,303

(22) Filed: Nov. 16, 2009

(65) Prior Publication Data
US 2011/0115549 A1    May 19, 2011

(51) Int. Cl.
*H02M 3/18* (2006.01)
(52) U.S. Cl. ......................................... 363/59
(58) Field of Classification Search .................... 363/59, 363/60; 327/536
See application file for complete search history.

(56) References Cited

U.S. PATENT DOCUMENTS

| | | | |
|---|---|---|---|
| 4,451,743 A | 5/1984 | Suzuki et al. | |
| 5,959,854 A | 9/1999 | Okada | |
| 5,999,040 A | 12/1999 | Do et al. | |
| 6,091,613 A | 7/2000 | Yang et al. | |
| 6,169,673 B1 | 1/2001 | McIntyre et al. | |
| 6,249,445 B1 | 6/2001 | Sugasawa | |
| 6,429,723 B1 | 8/2002 | Hastings | |
| 6,504,422 B1 | 1/2003 | Radar et al. | |
| 6,784,723 B2 | 8/2004 | Lee et al. | |
| 6,831,500 B2 | 12/2004 | Sato et al. | |
| 6,834,001 B2 | 12/2004 | Myono | |
| 6,859,091 B1 | 2/2005 | Nicholson et al. | |
| 6,934,187 B2 | 8/2005 | Cheung | |
| 7,009,857 B2 | 3/2006 | Chen et al. | |
| 7,173,478 B2 | 2/2007 | Chun | |
| 7,236,046 B2 | 6/2007 | Georgescu et al. | |
| 7,262,996 B2 | 8/2007 | Cheung | |
| 7,348,829 B2 | 3/2008 | Choy et al. | |
| 7,518,892 B2 | 4/2009 | Kitagawa et al. | |
| 7,558,129 B2 | 7/2009 | Thorp et al. | |
| 7,667,530 B2 | 2/2010 | Chu et al. | |
| 7,683,700 B2 | 3/2010 | Huynh et al. | |
| 7,702,061 B2 * | 4/2010 | Shao et al. | 377/47 |
| 7,755,584 B2 | 7/2010 | Senda et al. | |
| 7,919,998 B2 * | 4/2011 | Stanley | 327/131 |
| 2007/0052471 A1 | 3/2007 | Ng | |

(Continued)

OTHER PUBLICATIONS

Office Action mailed Dec. 10, 2010 in U.S. Appl. No. 12/633,584.

(Continued)

*Primary Examiner* — Shawn Riley
(74) *Attorney, Agent, or Firm* — Joanna G. Chiu; Robert L. King (57) ABSTRACT

A charge pump has circuitry and implements a method for monitoring a synchronous load by using a first voltage threshold below a target output voltage and a second voltage threshold above a target output voltage. An output terminal is coupled to the load. Charge is demanded by clocking the load. When the target output voltage passes below the first voltage threshold, a first value representing a present size of a charging capacitance is stored as a stored first value, and a second stored value representing a needed changed size of the charging capacitance is used. The present size of the charging capacitance is changed in response to the passing of the target output voltage below the first voltage threshold. When demand for charge from the load is reduced, a present value is saved and a prior value is restored to change the size of the charging capacitance.

20 Claims, 6 Drawing Sheets

U.S. PATENT DOCUMENTS

| | | |
|---|---|---|
| 2007/0252791 A1 | 11/2007 | Oomori |
| 2007/0279950 A1 | 12/2007 | Sugiyama et al. |
| 2008/0084239 A1 | 4/2008 | Oswald et al. |
| 2008/0191786 A1 | 8/2008 | Kwon et al. |
| 2009/0097285 A1 | 4/2009 | Cook et al. |
| 2009/0231022 A1 | 9/2009 | Kim et al. |
| 2010/0013445 A1 | 1/2010 | Martinussen |
| 2010/0052771 A1 | 3/2010 | Hartono |

OTHER PUBLICATIONS

U.S. Appl. No. 12/633,584, filed Dec. 8, 2009.

U.S. Appl. No. 12/549,499, filed Aug. 28, 2009.

Notice of Allowance mailed Oct. 1, 2010 in U.S. Appl. No. 12/549,499.

* cited by examiner

CHARGE PUMP FOR USE WITH A SYNCHRONOUS LOAD

BACKGROUND

1. Field

This disclosure relates generally to charge pumps, and more specifically, to a charge pump for use with a synchronous load.

2. Related Art

Traditional charge pumps suffer from several drawbacks. For example, they are limited to a narrow range of output voltages and loads. This is because a charge pump is typically required to satisfy certain performance requirements. Traditional charge pumps when used to obtain a broader range of output voltages and loads fail to meet these performance requirements. One of the performance requirements relates to a ripple factor that the output of the voltage multiplier needs to satisfy. Traditional charge pumps stop the clock when the output voltage is greater than the regulation voltage and then depend on the load to depress the output voltage. This method of generating a regulated voltage suffers from excessive ripple.

Furthermore, the ability for a charge pump to provide sufficient charge to a load may depend on the respective frequencies of the charge pump and the load. In some cases, in order for a traditional charge pumps to provide sufficient charge to a load, the load is designed to demand charge from the pump at a frequency lower than that of the charge pump. However, this may result in slower charge transfer to the load.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one embodiment, in order for a charge pump to accommodate synchronous loads, an increased-load register and reduced-load register is used to update a counter with the needed changed size of the charging capacitance of the charge pump to accommodate the removal or reduction of a synchronous load or the addition or increase of a synchronous load. In this manner, the recovery time for the charge pump to again regulate its output voltage to a desired target voltage may be improved.

Figure 1:
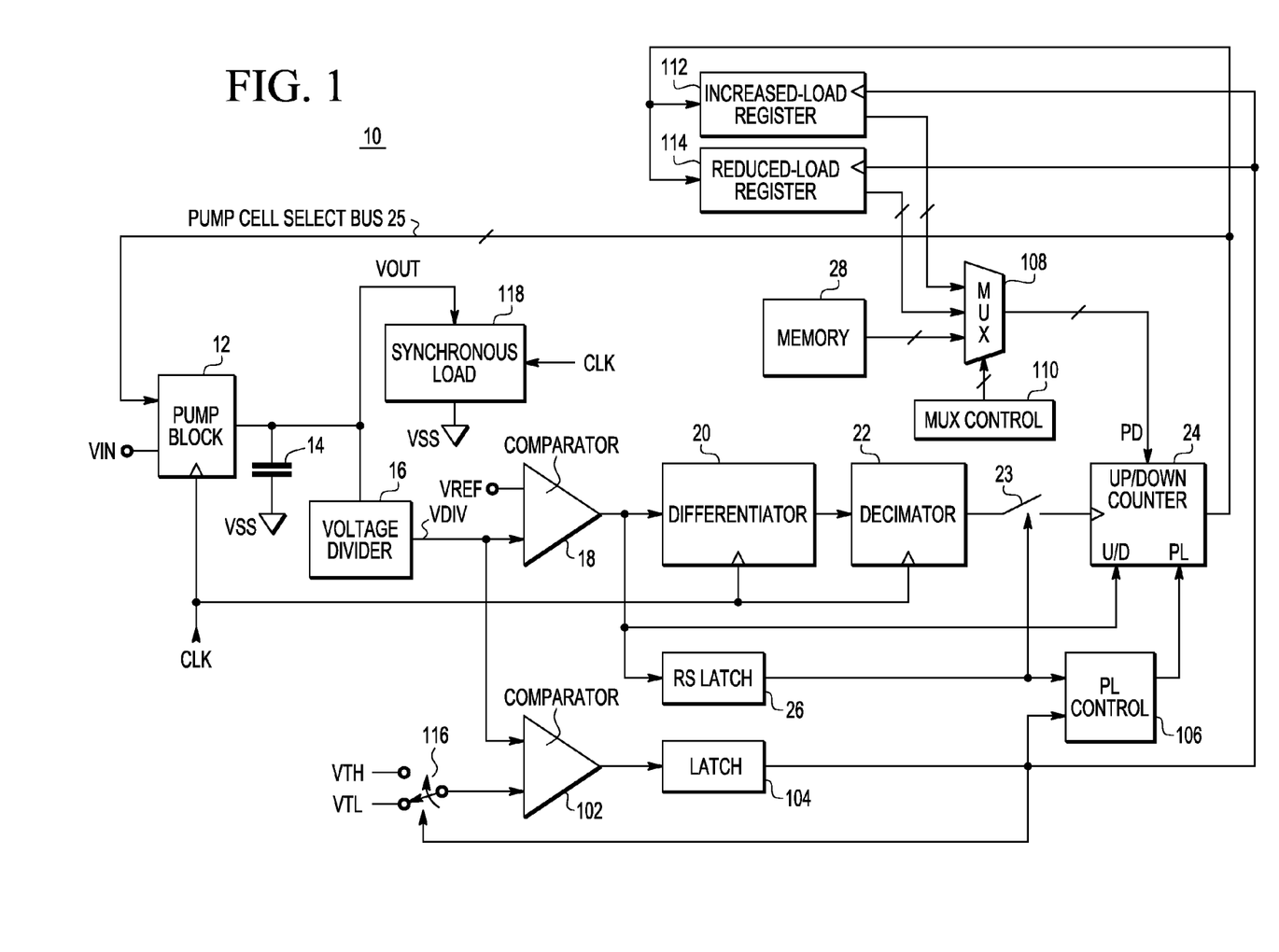
FIG. 1 illustrates, in block diagram form, a charge pump coupled to a synchronous load in accordance with one embodiment of the present invention.

FIG. 1 is a block diagram of an exemplary charge pump 10 coupled to a synchronous load 118. Charge pump 10 may receive a voltage input (VIN) and provide a regulated voltage as an output voltage (VOUT). Charge pump 10 may further receive a clock signal CLK. Charge pump 10 may include a pump block 12, a stability capacitor 14 (also referred to as a smoothing capacitor), a voltage divider 16, a comparator 18, a differentiator 20, a decimator 22, an up/down (U/D) counter 24, a reset/set (RS) latch 26, a memory 28, a comparator 102, a latch 104, a parallel load (PL) control 106, a multiplexer (MUX) 108, a MUX control 110, a reduced-load register 114, and an increased-load register 112. VOUT from pump block 12 is provided to a first terminal of stability capacitor 14, to a first power supply terminal of synchronous load 118, and to a first input of voltage divider 16. A second terminal of stability capacitor 14 and a second power supply terminal of synchronous load 118 is coupled to a ground. An output of voltage divider 16 provides a divided output voltage (VDIV) to a first input of comparator 18 and a first input of comparator 102. A second input of comparator 18 receives a reference voltage (VREF). An output of comparator 18 is coupled to an input of differentiator 20, an output of differentiator 20 is coupled to an input of decimator 22, and an output of decimator 22 is coupled to a first terminal of a switch 23. A second terminal of switch 23 is coupled to a clock input of U/D counter 24. The output of comparator 18 is provided to an up/down (U/D) input of U/D counter 24 and to an input of RS latch 26. An output of RS latch 26 is provided to a control input of switch 23 and a first input of PL control 106. An output of PL control 106 is provided to a parallel load (PL) input of U/D counter 24. A first terminal of a switch 116 is coupled to receive a high threshold voltage (VTH), a second terminal of switch 116 is coupled to receive a low threshold voltage (VTL), and a third terminal of switch 116 is coupled to a second input of comparator 102. An output of comparator 102 is provided to an input of latch 104. An output of latch 104 is coupled to a second input of PL control 106, to a control input of switch 116, and to clock inputs of each of registers 112 and 114. An output of U/D counter 24 is coupled to data inputs of each of registers 112 and 114 and provides a control input via pump cell select bus 25 to an input of pump block 12. A first data input of MUX 108 is coupled to receive an output from memory 28, a second data input of MUX 108 is coupled to receive an output from register 114, and a third data input of MUX 108 is coupled to receive an output from register 112. MUX control 110 provides a select signal to a control input of MUX 108. An output of MUX 108 is provided to a parallel data (PD) input of U/D counter 24.

By way of example, charge pump 10 may operate consistent with the principles of charge accumulation and charge transfer to output a regulated voltage, VOUT. During the accumulation step, a charge may be deposited on a capacitor (provided as part of pump block 12, for example, and may be referred to as a charging capacitor) and during the transfer step, charge could be moved from the charging capacitor to another capacitor or to a load (e.g. synchronous load 118) connected to receive the output voltage, for example. Stability capacitor 14 provides a reservoir of charge in the absence of a capacitive load. The charging capacitor, in pump block 12, is switched on and off (to supply charge to stability capacitor 14) at a switching frequency, according to the clock, CLK, provided to pump block 12. That is, the accumulation step and the transfer step may alternate with each other at the switching frequency. Charge pump 10 attempts to regulate VOUT to be at the level of a particular target voltage, as required by the load attached to charge pump 10. U/D counter 24 may provide a control input via pump cell select bus 25 to pump block 12. By way of example, the control input may be used to enable or disable pump cells contained within a pump stage of pump block 12, and thus change the impedance and charge capacity of pump block 12. For example, in one embodiment, N bits may be used to enable or disable any of the N pump cells located within in a pump stage. To accomplish selective use of pump cells any mechanism may be used to selectively enable/disable pump cells.

Figure 2:
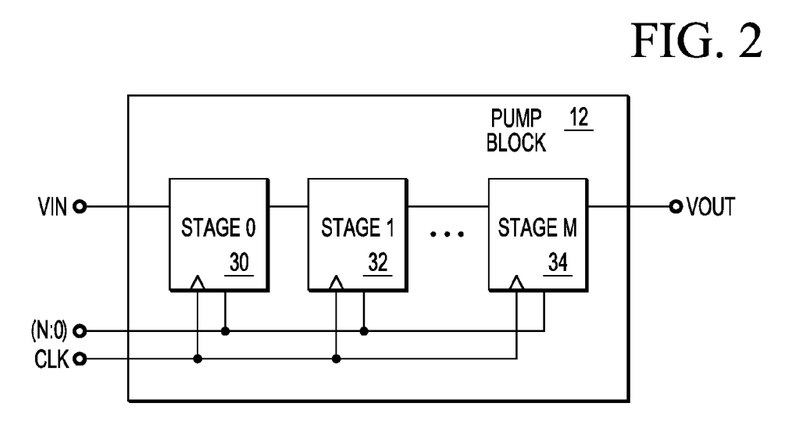
FIG. 2 illustrates, in block diagram form, the pump block of FIG. 1 in accordance with one embodiment of the present invention.

FIG. 2 is a block diagram of an exemplary pump block 12 for the exemplary charge pump shown in FIG. 1. By way of example, pump block 12 may include several pump stages: stage 0 30, stage 1 32, and stage M 34. Stage 0 30 may receive the input voltage (VIN) and stage M 34 may provide the regulated output voltage (VOUT). The output voltage of stage 0 30 may be provided an input voltage to stage 1 32 and so on and so forth. Thus, for example, stage M 34 may receive as input the output voltage of stage M−1 (not shown). Each stage may further receive the clock signal CLK and a control input (N:0) from U/D counter 24 via pump cell select bus 25. The control input from U/D counter 24 may be used to selectively enable/disable pump cells located within each pump stage. Although FIG. 2 shows the same control input as being coupled to each of the pump stages, different control inputs may be coupled to different pump stages. Thus, stage 0 30 may receive one set of control inputs and stage 1 32 may receive a different set of control inputs. In this manner, pump cells located within stage 0 30 and stage 1 32 may be independently enabled and/or disabled.

Figure 3:
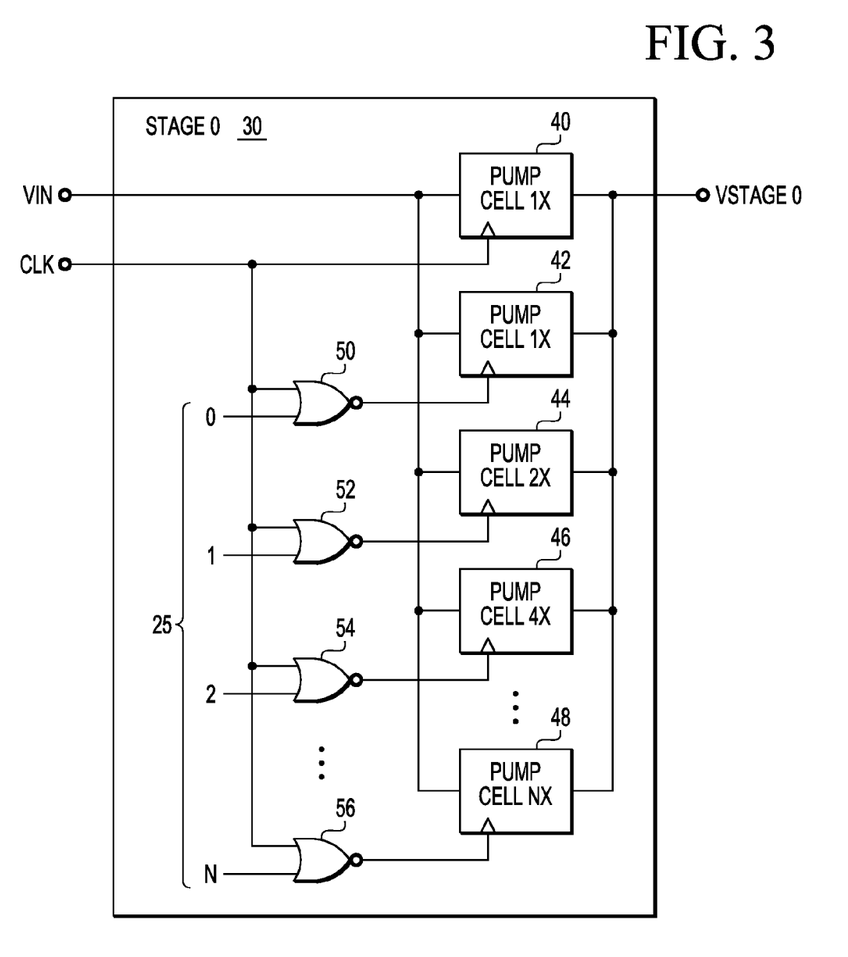
FIG. 3 illustrates, in block diagram form, a pump stage of the pump block shown in FIG. 2.

FIG. 3 is a block diagram of pump stage 30 of the exemplary pump block shown in FIG. 2. Pump stage 30 may be any of the pump stages shown in FIG. 2. Pump stage 30 may include at least two or more pump cells and corresponding logic. In one example, pump stage 30 may include a weighted capacitor array of pump cells. By way of example, pump stage 30 may include pump cell 1*x* 40, pump cell 1*x* 42, pump cell 2*x* 44, pump cell 4*x* 46, and pump cell N*x* 48. Pump cells 44, 46, and 48 may include two times, four times, and N times the number of capacitors in pump cells 40 and 42, respectively. Thus, for example, if pump cell 1*x* 40 includes a single capacitor, pump cell 2*x* 44 may include two capacitors, pump cell 4*x* may include four capacitors, and pump cell N*x* may include N capacitors. Although FIG. 3 discusses capacitors with an even number multiplier, an odd number multiplier may also be used. Also, in an alternate embodiment, the pump cells may not be weighted. Each pump cell is clocked only when the control signal (pump select signal) corresponding to the pump cell is low. Thus, pump stage 0 has a maximum impedance when all control signals are high and only pump cell 1*x* 40 is clocked and pump stage 0 has a minimum impedance when all control signals are low and all pump cells 40, 42, 44, 46, and 48 are clocked. By way of example, in one embodiment, NOR gates 50, 52, 54, and 56 may be used with respective control input (N:0) from pump control block 13 as one input and the clock (CLK) as the other input. The output of stage 0 30 labeled as $V_{stage0}$ may be provided as an input to stage 1 32 of FIG. 2. Pump stages 30, 32, and 34 may generate positive or negative voltages. In one embodiment, pump stages 30, 32, and 34 may be coupled in series.

Referring back to FIG. 1, by way of example, differentiator 20 monitors the output of comparator 18 and produces a pulse each time the comparator changes state. The pulses from differentiator 20 reset decimator 22. Decimator 22 may be coupled to U/D counter 24 via switch 23. Switch 23 may be closed or opened based on a switch control input, which may be received from RS latch 26. Note that once the output of comparator 18 causes RS latch 26 to go high (a logic level one), RS latch 26 remains high thus maintaining switch 23 closed until a reset is received by RS latch 26. This reset may be caused, for example, by a reset of the system containing charge pump 10 or upon power up of charge pump 10. By way of example, when switch 23 is closed, and after several clock cycles, decimator 22 generates a rising edge that causes U/D counter 24 to increment or decrement based on the comparator output (which is provided to differentiator 20 and to the U/D input of U/D counter 24). The initial ramp speed of charge pump 10 can be independently controlled via RS latch 26 and switch 23 between decimator 22 and U/D counter 24. In sum, a number of clock periods of a clock signal is tallied for which the output voltage of pump block 12 is above or below a reference voltage, and U/D counter 24 outputs a pump cell select signal as a function of the tallied number of clock periods for which the output voltage is above or below the reference voltage. By doing so, the capacitance of corresponding pump stages is adjusted to affect the output impedance of pump block 12.

Before starting charge pump 10 or in response to a reset signal, an initial value may be loaded into U/D counter 24 from memory 28. Note that values may be loaded into U/D counter 24 from either memory 28, or either of registers 112 or 114, via the PD input of U/D counter 24. Since U/D counter 24 is initially disabled, this initial value is used by pump block 12 until the first transition of comparator 18 which changes a state of RS latch 26 and triggers a parallel load of U/D counter 24. In particular, a change in the value of RS latch 26 opens or closes switch 23. For example, in one embodiment, when the value of RS latch 26 is set to a logic level one by the output of comparator 18 (indicating that VDIV has gone higher than VREF), switch 23 is closed. In one embodiment, at this point, a second value is loaded into U/D counter 24 from memory 28. Once RS latch 26 is set to a logic level one, decimator 22 is used to clock U/D counter 24 ensuring that charge pump 10 will automatically adjust (using the second value as its starting value) for changes in the load voltage and/or in the reference voltage, while minimizing ripple. In one embodiment, the initial value loaded into U/D counter 24 allows for an increased ramp-up rate for the voltage VDIV to reach VREF, and the second value is a value that allows for a reduced ramp-up rate once VREF has initially been reached. In alternate embodiments, at one or more predetermined points in time after VDIV initially reaches VREF, different counter values may be loaded into counter 24 from memory 28. Therefore, note that MUX control 110, upon reset, outputs a select value to MUX 108 which selects the output of memory 28. However, as will be described in more detail below with respect to FIGS. 6 and 7, after a predetermined amount of time, MUX control 110 will allow MUX 108 to select between the outputs of registers 112 and 114, rather than the output of memory 28, to load into U/D counter 24.

Figure 4:
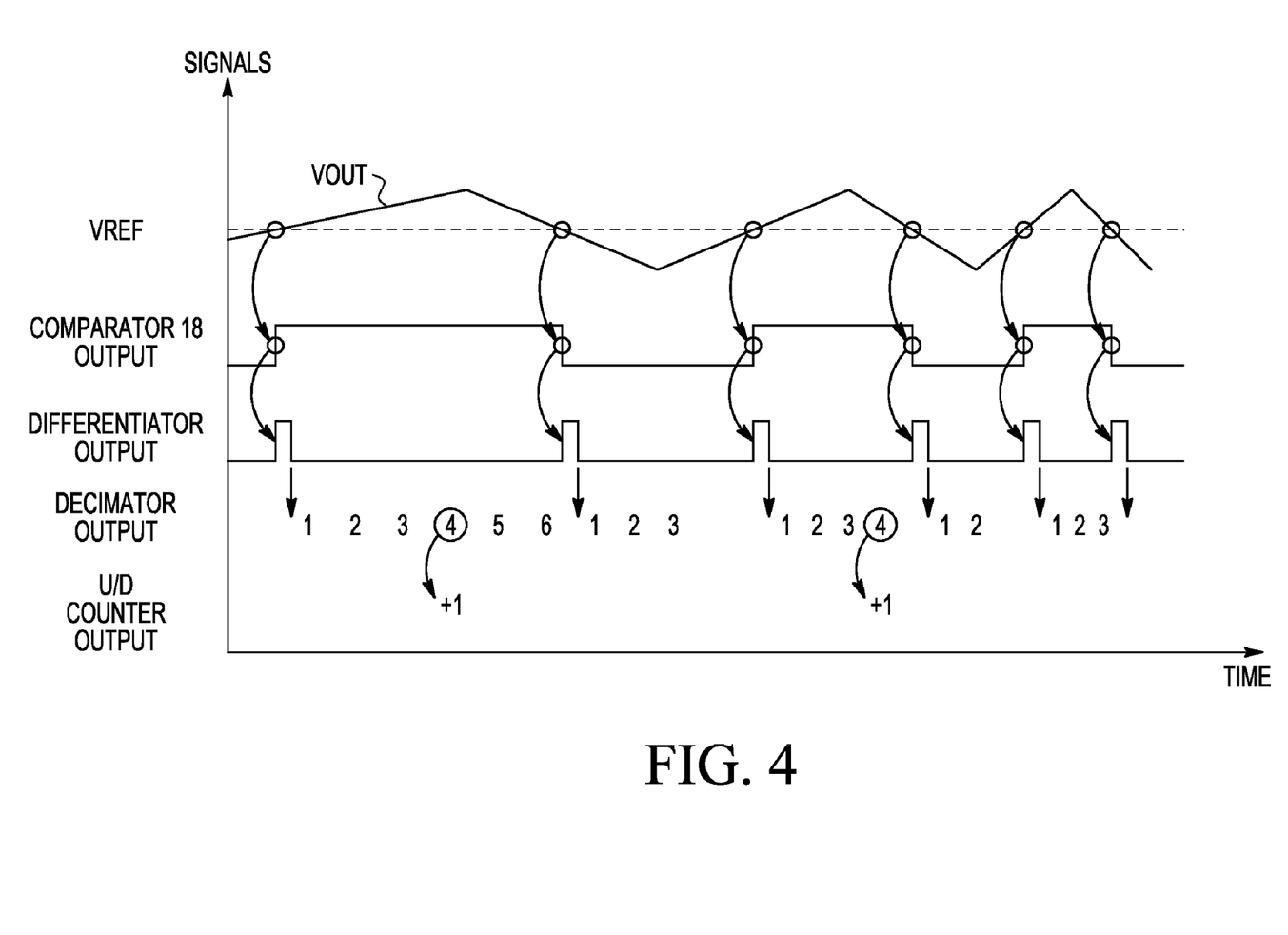
FIG. 4 is a diagram illustrating exemplary relationship among the various signals related to the charge pump of FIG. 1.

Operation of comparator 18, differentiator 20, decimator 22, and U/D counter will now further be described in reference to FIG. 4 which includes a diagram illustrating exemplary relationship among the various signals related to exemplary charge pump 10 shown in FIG. 1. In particular, FIG. 4 shows a relationship among the reference voltage (VREF), the output voltage (VOUT), the comparator output (the output of comparator 18), the differentiator output (the output of differentiator 20), the decimator output (the output of decimator 22), and the U/D counter input (the clock input of U/D counter 24). When the output voltage (VOUT) goes above the reference voltage (VREF), the comparator output (output of comparator 18 of FIG. 1) goes high (to a logic level one). (In one embodiment, the comparison of VOUT to VREF is performed by comparing VDIV, a portion of VOUT provided by voltage divider 16, to VREF.) In response to the comparator output going to a logic level one, differentiator 20 outputs a pulse. (Note that when the output of comparator 18 goes high for the first time after reset, RS latch 26 is set to a logic level 1, thus closing switch 23. Switch 23 then remains closed until RS latch 26 is reset, such as upon reset of charge pump 10.) Decimator 22 outputs a signal after the elapse of a predetermined number of clocks since the pulse generated by differentiator 20. By way of example, FIG. 4 shows decimator 22 outputting a signal after every four clocks. With switch 23 closed, U/D counter 24 is incremented in response to the signal from decimator 22. This increment is a result of the output of decimator 22 outputting a logic level one to the clock input of U/D counter 24 in combination with the output of comparator 18 (which is provided to the U/D input of U/D counter 24) being a logic level one when VOUT is above VREF. (Had the output of comparator 18 been a logic level zero, such as when VOUT is below VREF, U/D counter 24 would have been decremented rather than incremented upon decimator 22 outputting a logic level one.) An increase in the counter value results in additional impedance being added to pump block 12 because of an additional pump cell being selected as part of pump stage 0, for example.

As the output voltage (VOUT) goes below the reference voltage (VREF), the output of comparator 18 goes low (to a logic level zero). In response to the comparator output going low, differentiator 20 outputs a pulse. Decimator 22 does not output a logic level one this time because in the example shown in FIG. 4, the output voltage (VOUT) starts to go up before decimator 22 can assert the signal (before 4 clocks have elapsed since the most recent pulse by differentiator 20). As the output voltage (VOUT) goes above the reference voltage (VREF), the comparator output (output of comparator 18 of FIG. 1) goes high again. In response to the comparator output going high, differentiator 20 outputs a pulse. Decimator 22 outputs a logic level one to up/down counter 24 after the elapse of four clocks, which further results in up/down counter 24 being incremented. The incrementing and decrementing of U/D counter 24 results in automatic adjustment of the output impedance of pump block 12. When the output voltage (VOUT) is less than the reference voltage (VREF), the impedance of pump block 12 is too high and should be decreased. On the other hand, when the output voltage (VOUT) is greater than the reference voltage (VREF), the impedance of pump block 12 is too low and should be increased. In sum, charge pump 10 includes a mechanism to sense changes in the comparator output, a mechanism to count the clocks after a transition in an output of the comparator, and a mechanism to increment or decrement the impedance of pump block 12 by selectively clocking pump cells provided as part of pump block 12. The dynamic adjustment of impedance results in lower ripple than conventional voltage multipliers. In other words, comparator 18 and differentiator 20 sense transition changes in a comparison of the charge-pump circuit voltage output and the reference voltage. Decimator 22 counts the number of clock periods that occur after every sensed transition and U/D counter 24 increments or decrements the source impedance of pump block 12 as a function of the counted number of clock periods that occur after each sensed transition by selectively clocking the weighted capacitor array of pump cells of charge pump stages (30, 32, and 34, for example) to decrease or increase, respectively, a corresponding capacitance of the respective charge pump stages. Therefore, note that by changing the impedance of pump block 12, the charging capacitance of pump block 12 is changed.

Figure 5:
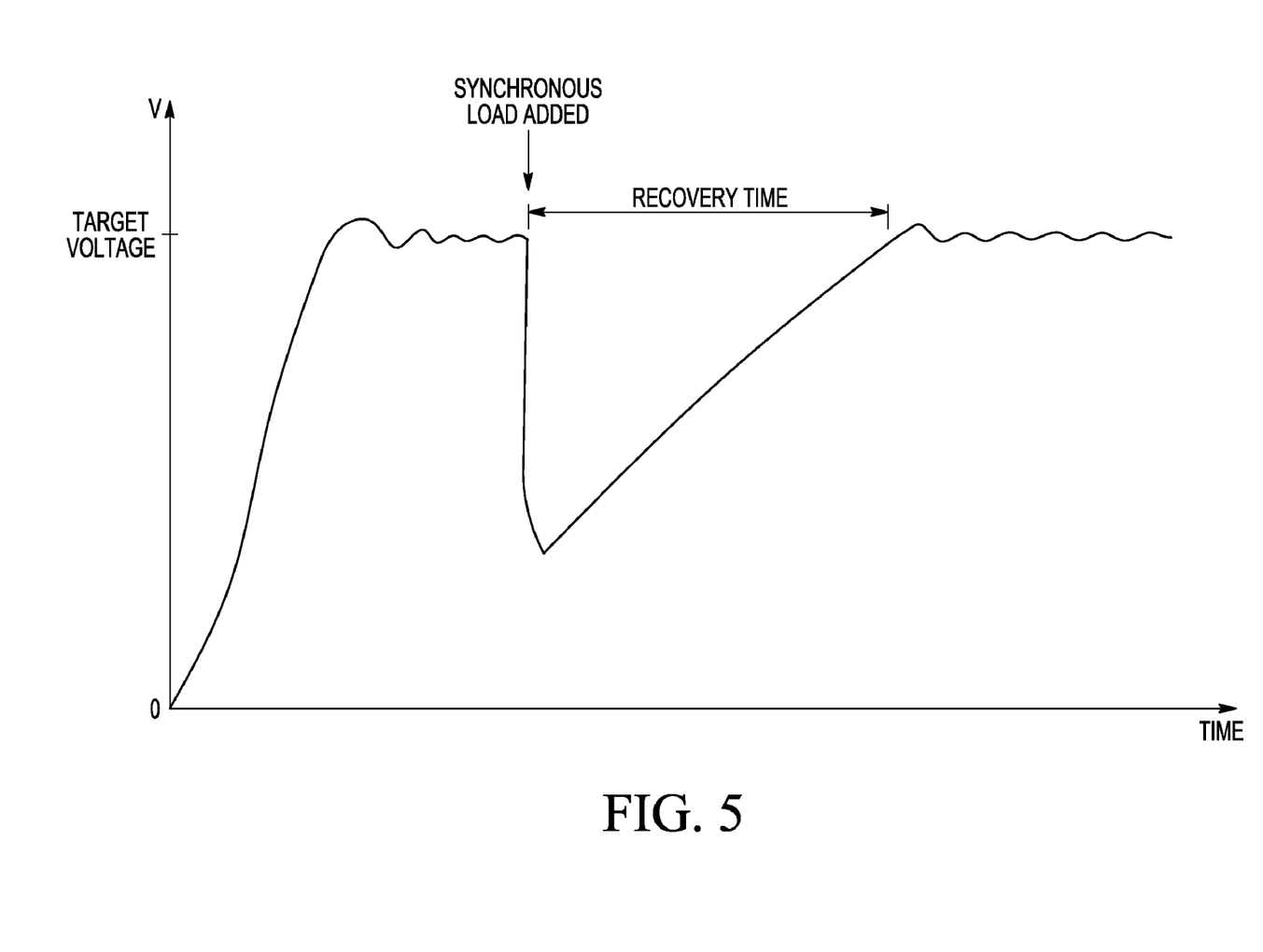
FIG. 5 is a timing diagram corresponding to operation of the charge pump of FIG. 1, in accordance with one embodiment of the present invention.

Referring back to FIG. 1, synchronous load 118 is coupled to receive VOUT. Synchronous load 118 is a synchronous load on charge pump 10. As used herein, a synchronous load is a load which is applied to the charge pump at the charge pump's switching frequency. That is, a synchronous load is one which demands charge from the charge pump on each clock cycle of the charge pump's clock. For example, synchronous load 118 may be a memory which is performing a read (such as a full power read) on each clock cycle of the clock (CLK) of pump block 12. Therefore, in one embodiment, synchronous load operates using the same clock, CLK, as pump block 12. When a synchronous load, such as synchronous load 118, is synchronously demanding charge at the switching frequency of pump block 12, pump block 12 is unable to transfer sufficient charge to stability capacitor 14. For example, referring to FIG. 5, an example is provided in which, after the output voltage (VOUT) of charge pump 10 reaches its target voltage, a synchronous load is added. When a synchronous load is added, the synchronous load demands charge at the charge pump's switching frequency. However, upon first adding the synchronous load, VOUT drops and, even with the help of U/D counter 24 which is continuously being decremented in order to lower the impedance of pump block 12, charge pump 10 requires a significant recovery time before VOUT again reaches the target voltage of the pump. For example, in one embodiment, this recovery time may be in the order of 2 microseconds. Therefore, in one embodiment, additional voltage thresholds may used to control U/D counter 24 to improve performance with a synchronous load such as by improving the recovery time.

Referring back to the operation of FIG. 1, comparator 102, latch 104, PL control 106, MUX control 110, and registers 112 and 114 may operate to improve performance of charge pump 10 when a synchronous load, such as synchronous load 118, is coupled to VOUT. Referring to FIG. 1, once switch 23 is closed and decimator 22 is used to clock U/D counter 24, VDIV is not only compared to VREF by comparator 18, but it is also compared to either a high voltage threshold (VTH) or a low voltage threshold (VTL) by comparator 102 to control the loading of U/D counter 24. (In one embodiment, VDIV corresponds to a portion of VOUT provided by voltage divider 16 based on VOUT.) Furthermore, once switch 23 is closed and decimator 22 is used to clock U/D counter 24, and after a predetermined amount of time, MUX 108 is controlled by MUX control 110 to select either the data output of register 112 or register 114 to provide to the PD input of U/D counter 24. (As discussed above, upon VOUT initially reaching VREF, memory 28 may be used to provide one or more counter values to the PD input of U/D counter 24; however, after a predetermined amount of time, MUX control 110 no longer selects the output of memory 28 but instead selects between registers 112 and 114. Note that the predetermined amount of time may be zero.) Operation of charge pump 10 from this point on will be described in further detail with respect to FIG. 6.

Still referring to FIG. 1, in one embodiment, switch 116 is initially set such that VTL is coupled to the second input of comparator 102 such that VDIV is compared to VTL. Therefore, referring to FIG. 6, operation may begin with start and proceed to decision diamond 120 in which it is determined whether VDIV is less than VTL. If not, flow returns to decision diamond 120. If so, flow proceeds to block 122. Therefore, referring back to FIG. 1, upon VDIV falling to the level of VTL, comparator 102 sets the value in latch 104 to a logic level one. Upon latch 104 storing a logic level one, switch 116 is toggled such that VHL is coupled to the second input of comparator 102 such that VDIV is compared to VHL. Therefore, switch 116 is toggled based on the output of comparator 102, in which switch 116 couples VTL to the second input of comparator 102 when the output of comparator 102 is low and couples VHL to the second input of comparator 102 when the output of comparator is high. Also, the output of latch 104 is used by PL control to provide the appropriate input to U/D counter 24. In one embodiment, PL control 106 operates such that, when RS latch 26 is set to a logic level one (i.e. transitions from low to high), PL control 106 provides a pulse (such as a positive pulse) to the PL input of U/D counter 24 such that the counter value of U/D counter 24 can be updated with whichever value is selected by MUX 108 to be provided to the PD input of U/D counter 24 at that time. However, once latch 26 is set to a logic level 1, PL control 106 provides a pulse to the PL input of U/D counter 24 each time the value of latch 104 transitions from low to high or high to low. In this manner, each time VDIV crosses either VTL or VHL, latch 104 transitions causing PL control 106 to provide a pulse to the PL input, resulting in a new value from either register 112 or 114 to be loaded into counter 24 via the PD input (as will be described in more detail below). Therefore, upon the output of comparator 102 going high and latch 104 transitioning from a logic level zero (assuming it was cleared to a logic level zero upon reset) to a logic level one, PL control 106 provides a pulse to U/D counter 24 such that a new value is loaded into U/D counter 14.

Referring back to FIG. 6, in block 122, the counter value of U/D counter 24 is stored into reduced-load register 114. Note that this counter value that is stored into reduced-load register 114 corresponds to the value of U/D counter 24 which maintains charge pump 10 at the appropriate impedance. That is, this counter value that is stored into reduced-load register 114 may represent the present size of a charging capacitance of pump block 12 at the moment just prior to the addition (or increased demand) of a synchronous load (which caused VOUT to fall below VTL). Therefore, as shown in FIG. 1, the current value of U/D counter 24 may be loaded into reduced-load register 114 as clocked by the output of latch 104 going from low to high. (In one embodiment, reduced-load register 114 is a positive edge triggered register and increased-load register 112 is a negative edge triggered register such that register 114 is loaded with a new value from U/D counter 24 when a low to high transition of its clock input is received and register 112 is loaded with a new value from U/D counter 24 when a high to low transition of its clock input is received.) Flow then proceeds to block 124 in which U/D counter 24 is updated with the value from increased-load register 112. In one embodiment, increased-load register 112 represents a needed changed size of the charging capacitance of pump block 12 to accommodate the addition of a synchronous load. Initially, a predetermined value may be stored in increased-load register 112 which may be determined in a variety of different ways, such as by testing charge pump 10. However, as will be described in reference to later blocks in the flow of FIG. 6, once charge pump 10 has been running, increased-load register 112 may represent the present size of a charging capacitance of pump block 12 at a moment just prior to the removal (or reduced demand) of a synchronous load. Therefore, referring to FIG. 1, MUX control 110 selects the output of increased-load register 112 to provide to PD such that, upon PL control 106 providing the pulse to U/D counter 24 (resulting from comparator 102 and latch 104 transitioning from low to high), the value of increased-load register 112 is loaded into U/D counter 24. (In one embodiment, the value of increased-load register 112 that is loaded into counter 24 increases the charging capacitance of pump block 12, thus reducing the impedance of pump block 12.) Referring back to FIG. 6, flow proceeds to block 126 in which normal operation of U/D counter 24 based on the output of comparator 18 resumes in order to regulate VOUT to the target voltage. At this point, comparator 102 is comparing VDIV to VTH and the output of comparator 102 is still high since VDIV has not yet risen above VTH.

Figure 6:
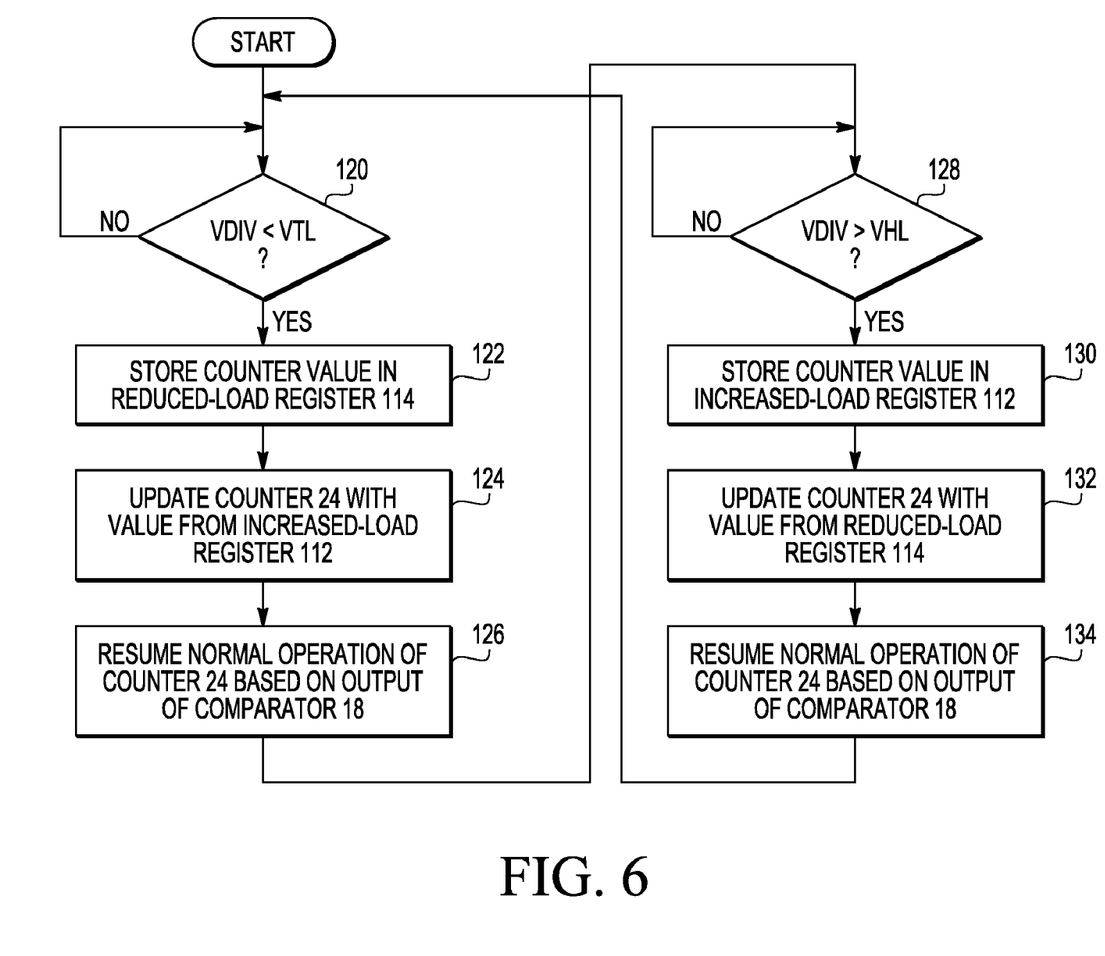
FIG. 6 is a flow diagram of a method of operating the charge pump of FIG. 1, in accordance with one embodiment of the present invention.

Still referring to FIG. 6, after block 126, flow proceeds to decision diamond 128 in which it is determined whether VDIV is greater than VTH. If not, flow returns to decision diamond 128. If so, flow proceeds to block 130. Therefore, referring back to FIG. 1, upon VDIV reaching the level of VTH, comparator 102 sets the value in latch 104 to a logic level zero. Upon latch 104 transitioning from a logic level one back to a logic level zero, switch 116 is toggled such that VTL is again coupled to the second input of comparator 102 such that VDIV is compared to VTL.

Referring back to FIG. 6, in block 130, the counter value of U/D counter 24 is stored into increased-load register 112. Note that this counter value that is stored into increased-load register 112 corresponds to the value of U/D counter 24 which maintains charge pump 10 at the appropriate impedance for the increased load situation (such as for the situation in which a synchronous load is present). That is, this counter value that is stored into increased-load register 112 may represent the present size of a charging capacitance of pump block 12 at the moment just prior to the removal (or reduced demand) of a synchronous load (which caused VOUT to go above VTH). Therefore, as shown in FIG. 1, the current value of U/D counter 24 may be loaded into increased-load register 112 as clocked by the output of latch 104 transitioning from high to low. Flow then proceeds to block 132 in which U/D counter 24 is updated with the value from reduced-load register 114. In one embodiment, reduced-load register 114 represents a needed changed size of the charging capacitance of pump block 12 to accommodate the removal or reduction of a synchronous load. Therefore, referring to FIG. 1, MUX control 110 selects the output of reduced-load register 114 to provide to PD such that, upon PL control 106 providing a pulse to U/D counter 24 (resulting from comparator 102 and latch 104 transitioning from high to low), the value of reduced-load register 114 is loaded into U/D counter 24. (In one embodiment, the value of reduced-load register 114 that is loaded into counter 24 decreases the charging capacitance of pump block 12, thus increasing the impedance of pump block 12.) Referring back to FIG. 6, flow proceeds to block 134 in which normal operation of U/D counter 24 based on the output of comparator 18 resumes in order to regulate VOUT to the target voltage. At this point, comparator 102 is again comparing VDIV to VTL and the output of comparator 102 is still low since VDIV has not yet fallen below VTL. Therefore, flow continues to decision diamond 120 and proceeds as described above.

Figure 7:
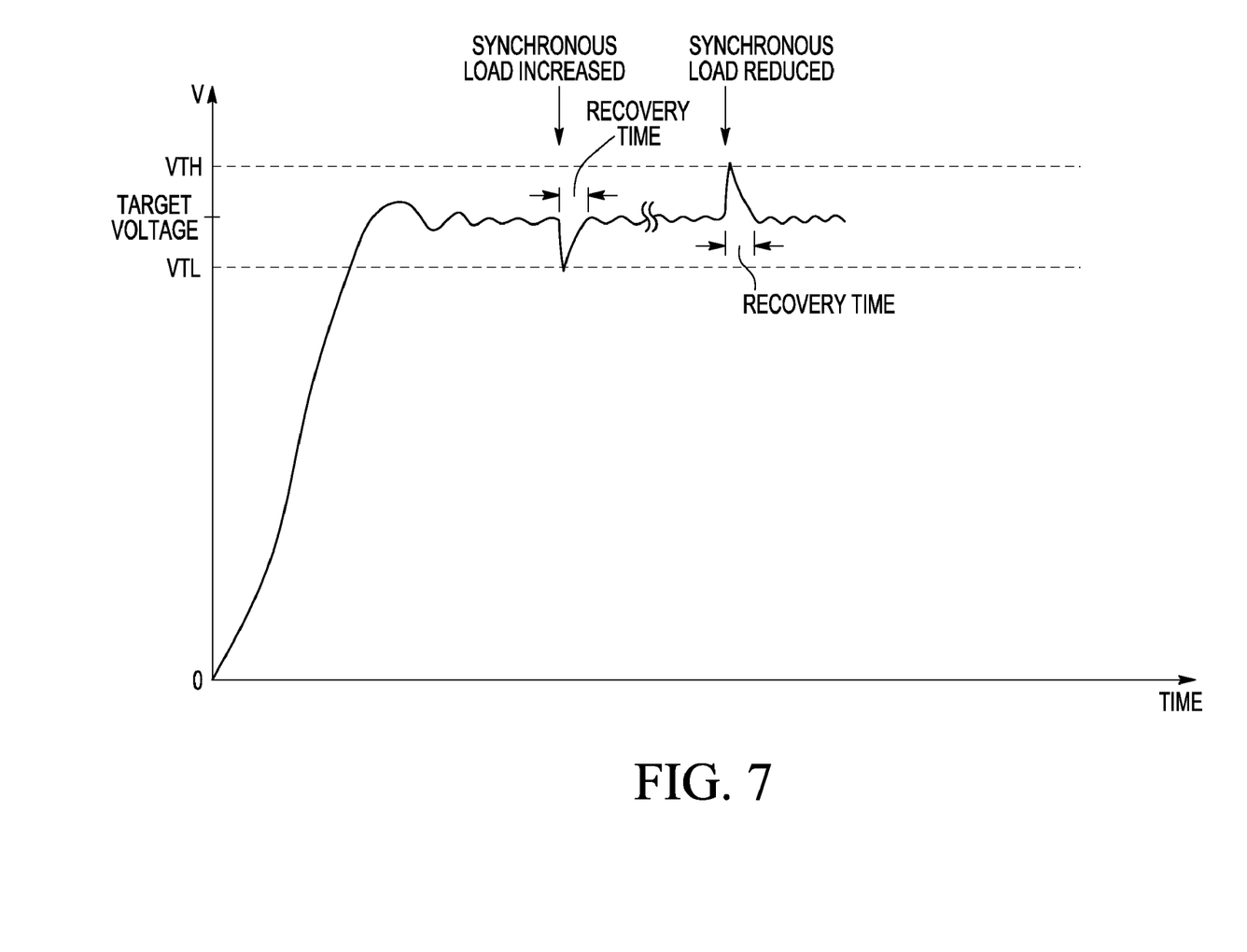
FIG. 7 is a timing diagram corresponding to operation of the charge pump of FIG. 1, in accordance with one embodiment of the present invention.

By using increased-load register 112 and reduced-load register 114 to update U/D counter 24 with the needed changed size of the charging capacitance of pump block 12 to accommodate the removal or reduction of a synchronous load or the addition or increase of a synchronous load, the recovery time for charge pump 10 to again regulate VOUT to the target voltage can be improved by adjusting the charging capacitance of charge pump 10. For example, FIG. 7 illustrates the situation in which the synchronous load is increased (where, for example, a synchronous load begins to demand or increases its demand for charge from charge pump 10 at the switching frequency of charge pump 10) and then again decreased (where, for example, the synchronous load ceases to demand or decreases its demand for charge from charge pump 10 at the switching frequency of charge pump 10). At the point at which the synchronous load is increased, VOUT drops; however, upon VOUT dropping below the threshold VTL, the current value of U/D counter 24 is stored into reduced-load register 114 and the value of U/D counter 24 is then updated with the contents of increased-load register 112. By loading U/D counter 24 with the contents of increased-load register 112, which may represent the needed changed size of charging capacitance of pump block 12 (for example, it may represent the value of counter 24 at a point just prior to the reduction of a synchronous load), the charging capacitance is increased and the recovery time for charge pump 10 to return VOUT to the target voltage through the use of this new counter value for U/D counter 24 may be improved as compared to not using the new counter value for U/D counter 24 and simply letting comparator 18 control U/D counter 24. Similarly, at the point at which the synchronous load is decreased, VOUT increases; however, upon VOUT going above the threshold VHL, the current value of U/D counter 24 is stored into increased-load register 112 (which represents the value of counter 24 just prior to the reduction of a synchronous load). The value of U/D counter 24 is then updated with the contents of reduced-load register 114. By loading U/D counter 24 with the contents of reduced-load register 114, which may represent the needed changed size of charging capacitance of pump block 12 (for example, it may represent the value of counter 24 at a point just prior to the increase of a synchronous load), the charging capacitance is decreased and the recovery time for charge pump 10 to return VOUT to the target voltage through the use of this new counter value for U/D counter 24 may be improved as compared to not using the new counter value for U/D counter 24 and simply letting comparator 18 control U/D counter 24.

The new values of U/D counter 24 provided by registers 112 and 114 upon reaching each of VTL and VTH, controls, by way of pump cell select bus 25, the charging capacitance of pump block 12, and thus of charge pump 10. These new values provide new starting points for counter 24 upon the addition or removal of a synchronous load. For example, when counter 24 is loaded with the value in increased-load register 112, the capacitance of pump block 12 is increased (and thus the impedance reduced) and when counter 24 is loaded with the value in reduced-load register 114, the capacitance of pump block 12 is decreased (and thus the impedance increased). Therefore, in one embodiment, counter 24 provides an output count value, such as via pump cell select bus 25 to pump block 12, which is used to provide a standby count value which maintains the output voltage as a standby regulated voltage (such as the target voltage), to provide a first regulated voltage count value to increase capacitance of the clocked pump circuit (e.g. pump block 12) in response to comparator 102 detecting that VOUT has fallen below VTL, and provide a second regulated voltage count value to decrease capacitance of the clocked pump circuit in response to comparator 102 detecting that VOUT has risen above VTH. For example, in one embodiment, VOUT is maintained as the standby regulated voltage when the clock CLK is not clocking synchronous load 118.

Although FIG. 1 shows a specific number of components arranged in a specific manner, alternate embodiments of charge-based voltage multiplier 10 may include fewer or additional components, which may be arranged differently. For example, although FIG. 1 shows a specific embodiment including a differentiator, a decimator, and an up/down counter, any mechanism to sense changes in the comparator output, any mechanism to count the clocks after a transition in an output of the comparator, and any mechanism to increment or decrement the impedance of pump block 12 may be used. Furthermore, the polarities of the comparators, such as comparators 18 and 102, may be reversed. Also, any storage circuitry rather than registers may be used to store the count values for U/D counter 24. Also, note that in alternate embodiments, one-shot circuitry may be used on the outputs of latches 26 and 104 to provide inputs to PL control 106. PL control 106 can be designed in a variety of different ways to implement the functionality described above, in which PL control 106 may or may not include one-shot circuitry.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following includes various embodiments of the present invention.

Item 1 includes a method including providing circuitry for monitoring a synchronous load by using a first voltage threshold below a target output voltage of a charge pump and a second voltage threshold above the target output voltage; providing an output terminal of the charge pump for providing an output voltage and being coupled to the synchronous load; demanding charge from the charge pump by clocking the synchronous load; upon detecting a passing of the target output voltage below the first voltage threshold, storing a first value representing a present size of a charging capacitance as a stored first value and using a second stored value representing a needed changed size of the charging capacitance; changing the present size of the charging capacitance in response to the passing of the target output voltage below the first voltage threshold; reducing demand for charge from the synchronous load; and upon detecting a passing of the target output voltage above the second voltage threshold, storing a third value representing a present size of the charging capacitance as the second stored value, replacing the third value representing the present size of the charging capacitance with the stored first value, and using the stored first value to change the present size of the charging capacitance. Item 2 includes the method of item 1 and further includes using two comparators to control a counter for providing a count value which determines the present size of the charging capacitance. Item 3 includes the method of item 2 and further includes comparing with a first comparator of the two comparators a portion of the output voltage to either the first voltage threshold or the second voltage threshold in response to an output of the first comparator. Item 4 includes the method of item 3 and further includes coupling an output of the first comparator of the two comparators to a counter circuit for providing a count value, the count value controlling changes of the present size of the charging capacitance. Item 5 includes the method of item 4 and further includes coupling an output of the first comparator of the two comparators to a first storage device for storing the first value; and coupling the output of the first comparator of the two comparators to a second storage device for storing the second stored value. Item 6 includes the method of item 5 and further includes comparing with a second comparator of the two comparators the portion of the output voltage with a reference voltage; detecting a change of an output of the second comparator to provide a control signal; and clocking the counter with a decimated form of the control signal.

Item 7 includes a charge pump including a pump circuit having a charging capacitor for providing an output voltage having a target value at an output terminal; a synchronous load coupled to the output terminal, the pump circuit and the synchronous load having clock inputs for receiving a same clock signal; a first comparator having a first input coupled to the output voltage, a second input coupled to a reference voltage, and an output; a counter having a first input coupled to the output of the first comparator for controlling a count direction, a clock input coupled to a decimated form of the output of the first comparator, a control input, a count value input for receiving a count value, and an output coupled to the pump circuit; a second comparator having a first input coupled to the output voltage, a second input alternately coupled to a first voltage threshold below a target output voltage of a charge pump and a second voltage threshold above the target output voltage, and an output coupled to the control input of the counter; a first storage device coupled to the counter for storing and providing a first value representing a counter starting count to change a needed size of the charging capacitor to raise the output voltage to the target output voltage; and a second storage device coupled to the counter for storing and providing a second value representing the counter starting count to lower the needed size of the charging capacitor to the target output voltage. Item 8 includes the charge pump of item 7 wherein the first value increases the needed size of the charging capacitor. Item 9 includes the charge pump of item 7 wherein the second value decreases the needed size of the charging capacitor. Item 10 includes the charge pump of item 7 and further includes a switch having a first terminal for receiving the first voltage threshold, a second terminal for receiving the second voltage threshold, a third terminal coupled to the second input of the second comparator, and a control terminal coupled to the output of the second comparator. Item 11 includes the charge pump of item 7 wherein the first storage device and second storage device each have a respective input coupled to the output of the counter and respectively comprise a first clocked register and a second clocked register, each of the first clocked register and the second clocked register having a clock input coupled to the output of the second comparator, and having an output. Item 12 includes the charge pump of item 11 and further includes a memory coupled to the counter for storing an initial count value for the counter. Item 13 includes the charge pump of item 12 and further includes a multiplexor having a first input coupled to the memory, a second input coupled to the output of the first clocked register, a third input coupled to the output of the second clocked register, and an output coupled to a data input of the counter.

Item 14 includes a charge pump including a clocked pump circuit for providing an output voltage having a target value at an output terminal in response to a clock signal; a synchronous load coupled to the output terminal and having a clock input for receiving the clock signal; a first comparator having a first input coupled to the output voltage, a second input coupled to a reference voltage, and an output; a second comparator having a first input coupled to the output voltage, a second input alternately coupled to a first voltage threshold below the target value of the output voltage and a second voltage threshold above the target value of the output voltage, and an output; a counter coupled to the output of the first comparator and to the output of the second comparator, the counter providing an output count value which is used to: (1) provide a standby count value which maintains the output voltage as a standby regulated voltage; (2) provide a first regulated voltage count value to increase capacitance of the clocked pump circuit in response to the second comparator detecting that the output voltage has fallen below the first voltage threshold; and (3) provide a second regulated voltage count value to decrease capacitance of the clocked pump circuit in response to the second comparator detecting that the output voltage has risen above the second voltage threshold; and the charge pump further includes control circuitry coupled to the counter to selectively save and restore count values to the counter in response to the second comparator. Item 15 includes the charge pump of item 14 wherein when the clock signal is not clocking the synchronous load the output voltage is maintained as the standby regulated voltage, and the standby count value is provided in response to the output of the first comparator. Item 16 includes the charge pump of item 15 and further includes storage means coupled to the counter, the storage means storing the standby count value and providing the standby count value to a data input of the counter. Item 17 includes the charge pump of item 16 wherein the control circuitry further comprises first and second clocked registers for storing the saved and restored count values and being clocked by the second comparator. Item 18 includes the charge pump of item 17 wherein the control circuitry further comprises a multiplexor coupled to the storage means, the first and second clocked registers, and the counter for selecting count values to be provided to the counter. Item 19 includes the charge pump of item 14 and further includes a switch having input terminals respectively coupled to the first voltage threshold and the second voltage threshold, an output coupled to the second input of the second comparator, and a control terminal coupled to the output of the second comparator. Item 20 includes the charge pump of item 14 and further includes logic circuitry having a first input coupled to the output of first comparator, a second input coupled to the output of the second comparator, and an output coupled to a data load control input of the counter, the logic circuitry comprising an OR logic function and having circuitry to limit the output of the first comparator to transition to and from an asserted state only once.

What is claimed is:

1. A method, comprising:
providing circuitry for monitoring a synchronous load by using a first voltage threshold below a target output voltage of a charge pump and a second voltage threshold above the target output voltage;
providing an output terminal of the charge pump for providing an output voltage and being coupled to the synchronous load;
demanding charge from the charge pump by clocking the synchronous load;
upon detecting a passing of the target output voltage below the first voltage threshold, storing a first value representing a present size of a charging capacitance as a stored first value and using a second stored value representing a needed changed size of the charging capacitance;
changing the present size of the charging capacitance in response to the passing of the target output voltage below the first voltage threshold;
reducing demand for charge from the synchronous load; and
upon detecting a passing of the target output voltage above the second voltage threshold, storing a third value representing a present size of the charging capacitance as the second stored value, replacing the third value representing the present size of the charging capacitance with the stored first value, and using the stored first value to change the present size of the charging capacitance.

2. The method of claim 1 further comprising:
using two comparators to control a counter for providing a count value which determines the present size of the charging capacitance.

3. The method of claim 2 further comprising:
comparing with a first comparator of the two comparators a portion of the output voltage to either the first voltage threshold or the second voltage threshold in response to an output of the first comparator.

4. The method of claim 3 further comprising:
coupling an output of the first comparator of the two comparators to a counter circuit for providing a count value, the count value controlling changes of the present size of the charging capacitance.

5. The method of claim 4 further comprising:
coupling an output of the first comparator of the two comparators to a first storage device for storing the first value; and
coupling the output of the first comparator of the two comparators to a second storage device for storing the second stored value.

6. The method of claim 5 further comprising:
comparing with a second comparator of the two comparators the portion of the output voltage with a reference voltage;
detecting a change of an output of the second comparator to provide a control signal; and
clocking the counter with a decimated form of the control signal.

7. A charge pump comprising:
a pump circuit having a charging capacitor for providing an output voltage having a target value at an output terminal;
a synchronous load coupled to the output terminal, the pump circuit and the synchronous load having clock inputs for receiving a same clock signal;
a first comparator having a first input coupled to the output voltage, a second input coupled to a reference voltage, and an output;
a counter having a first input coupled to the output of the first comparator for controlling a count direction, a clock input coupled to a decimated form of the output of the first comparator, a control input, a count value input for receiving a count value, and an output coupled to the pump circuit;
a second comparator having a first input coupled to the output voltage, a second input alternately coupled to a first voltage threshold below a target output voltage of a charge pump and a second voltage threshold above the target output voltage, and an output coupled to the control input of the counter;
a first storage device coupled to the counter for storing and providing a first value representing a counter starting count to change a needed size of the charging capacitor to raise the output voltage to the target output voltage; and
a second storage device coupled to the counter for storing and providing a second value representing the counter starting count to lower the needed size of the charging capacitor to the target output voltage.

8. The charge pump of claim 7 wherein the first value increases the needed size of the charging capacitor.

9. The charge pump of claim 7 wherein the second value decreases the needed size of the charging capacitor.

10. The charge pump of claim 7 further comprising:
a switch having a first terminal for receiving the first voltage threshold, a second terminal for receiving the second voltage threshold, a third terminal coupled to the second input of the second comparator, and a control terminal coupled to the output of the second comparator.

11. The charge pump of claim 7 wherein the first storage device and second storage device each have a respective input coupled to the output of the counter and respectively comprise a first clocked register and a second clocked register, each of the first clocked register and the second clocked register having a clock input coupled to the output of the second comparator, and having an output.

12. The charge pump of claim 11 further comprising:
a memory coupled to the counter for storing an initial count value for the counter.

13. The charge pump of claim 12 further comprising:
a multiplexor having a first input coupled to the memory, a second input coupled to the output of the first clocked register, a third input coupled to the output of the second clocked register, and an output coupled to a data input of the counter.

14. A charge pump comprising:
a clocked pump circuit for providing an output voltage having a target value at an output terminal in response to a clock signal;
a synchronous load coupled to the output terminal and having a clock input for receiving the clock signal;
a first comparator having a first input coupled to the output voltage, a second input coupled to a reference voltage, and an output;
a second comparator having a first input coupled to the output voltage, a second input alternately coupled to a first voltage threshold below the target value of the output voltage and a second voltage threshold above the target value of the output voltage, and an output;
a counter coupled to the output of the first comparator and to the output of the second comparator, the counter providing an output count value which is used to:
(1) provide a standby count value which maintains the output voltage as a standby regulated voltage;
(2) provide a first regulated voltage count value to increase capacitance of the clocked pump circuit in response to the second comparator detecting that the output voltage has fallen below the first voltage threshold; and
(3) provide a second regulated voltage count value to decrease capacitance of the clocked pump circuit in response to the second comparator detecting that the output voltage has risen above the second voltage threshold; and
control circuitry coupled to the counter to selectively save and restore count values to the counter in response to the second comparator.

15. The charge pump of claim 14 wherein when the clock signal is not clocking the synchronous load the output voltage is maintained as the standby regulated voltage, and the standby count value is provided in response to the output of the first comparator.

16. The charge pump of claim 15 further comprising:
storage means coupled to the counter, the storage means storing the standby count value and providing the standby count value to a data input of the counter.

17. The charge pump of claim 16 wherein the control circuitry further comprises first and second clocked registers for storing the saved and restored count values and being clocked by the second comparator.

18. The charge pump of claim 17 wherein the control circuitry further comprises a multiplexor coupled to the storage means, the first and second clocked registers, and the counter for selecting count values to be provided to the counter.

19. The charge pump of claim 14 further comprising:
a switch having input terminals respectively coupled to the first voltage threshold and the second voltage threshold, an output coupled to the second input of the second comparator, and a control terminal coupled to the output of the second comparator.

20. The charge pump of claim 14 further comprising:
logic circuitry having a first input coupled to the output of first comparator, a second input coupled to the output of the second comparator, and an output coupled to a data load control input of the counter, the logic circuitry comprising an OR logic function and having circuitry to limit the output of the first comparator to transition to and from an asserted state only once.

* * * * *